Sept. 16, 1969   R. S. EASLEY ET AL   3,467,805
CAMSHAFT HARDENER
Filed Sept. 8, 1966   5 Sheets-Sheet 3
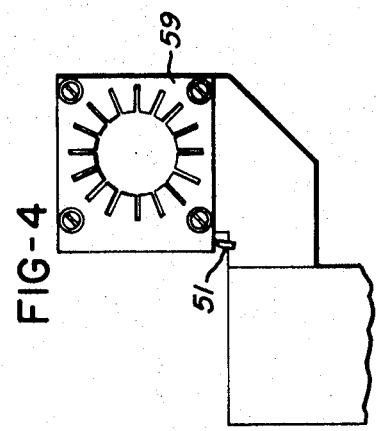
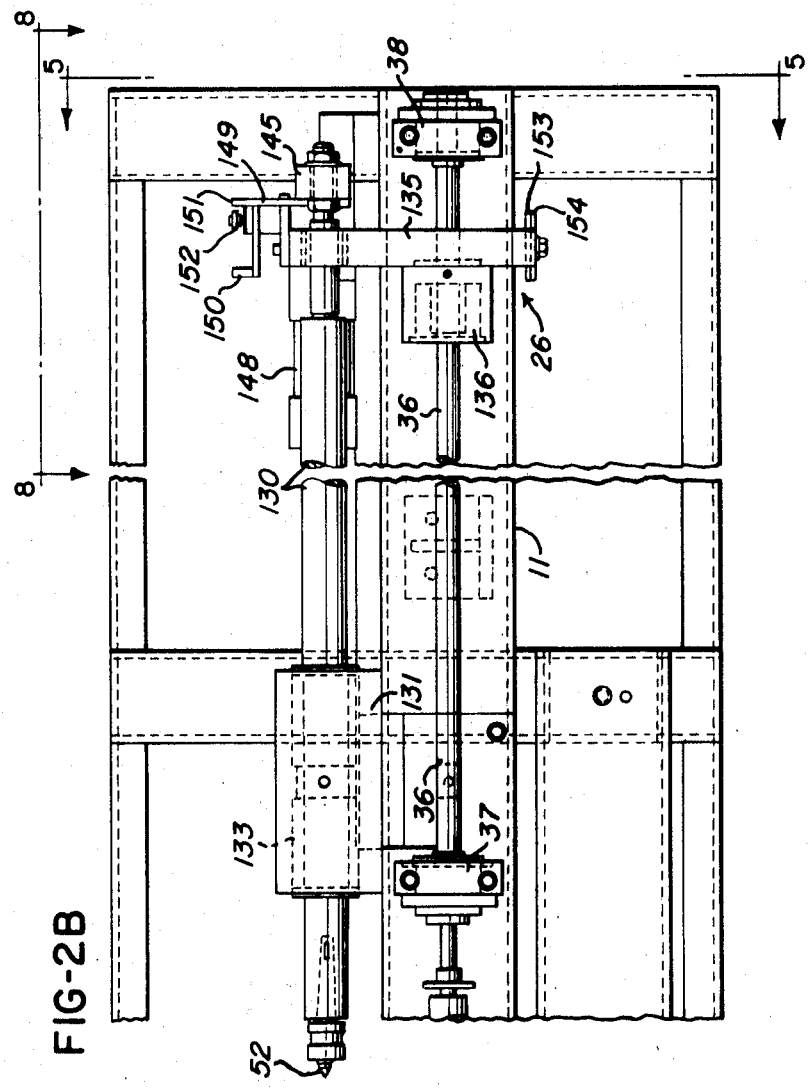

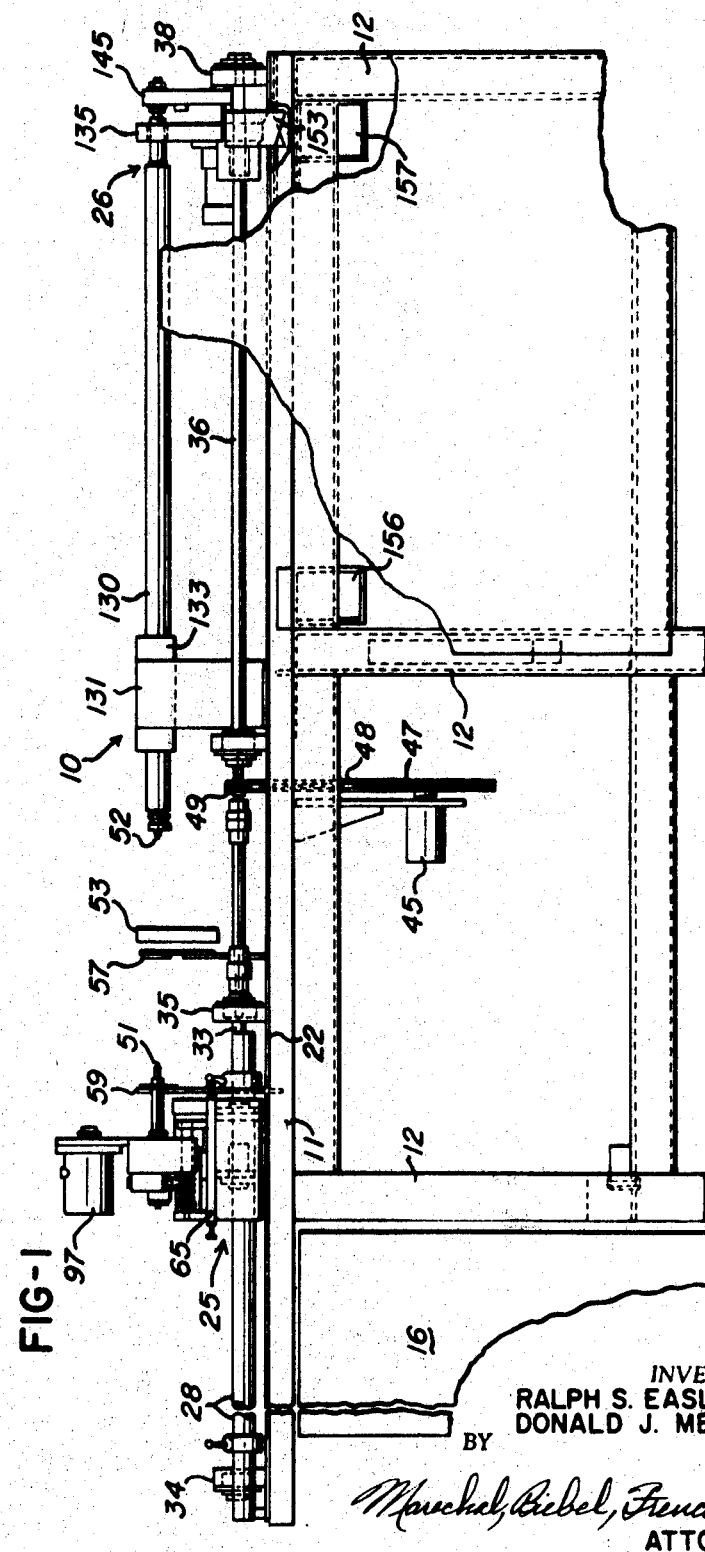

Sept. 16, 1969   R. S. EASLEY ET AL   3,467,805
CAMSHAFT HARDENER
Filed Sept. 8, 1966   5 Sheets-Sheet 4
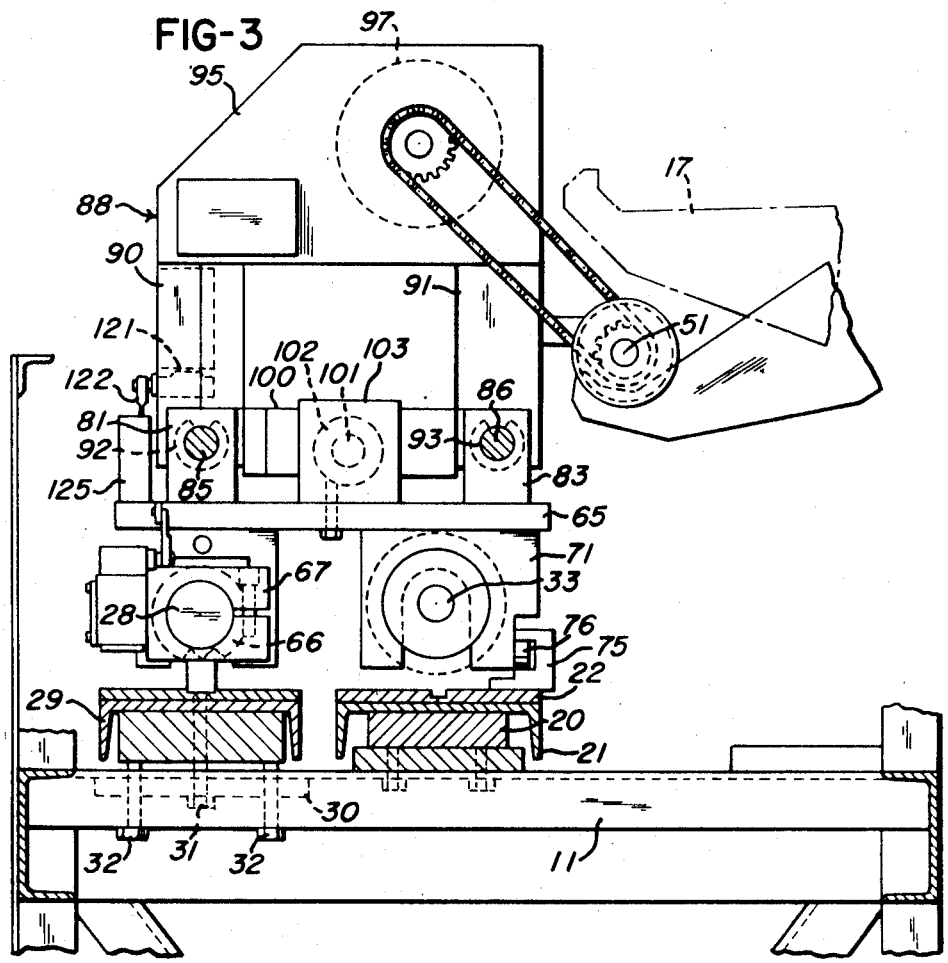
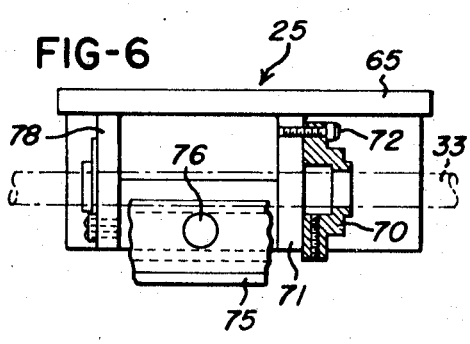
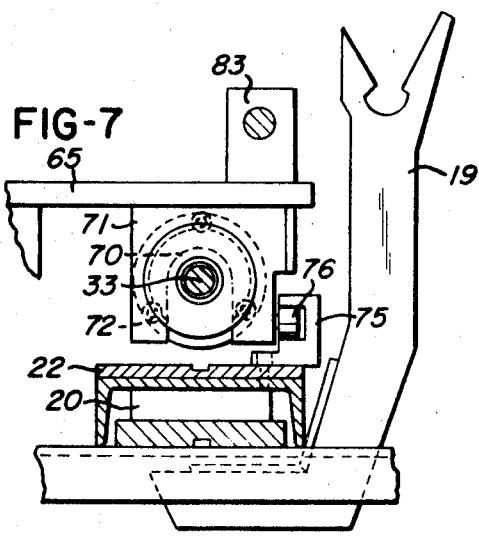

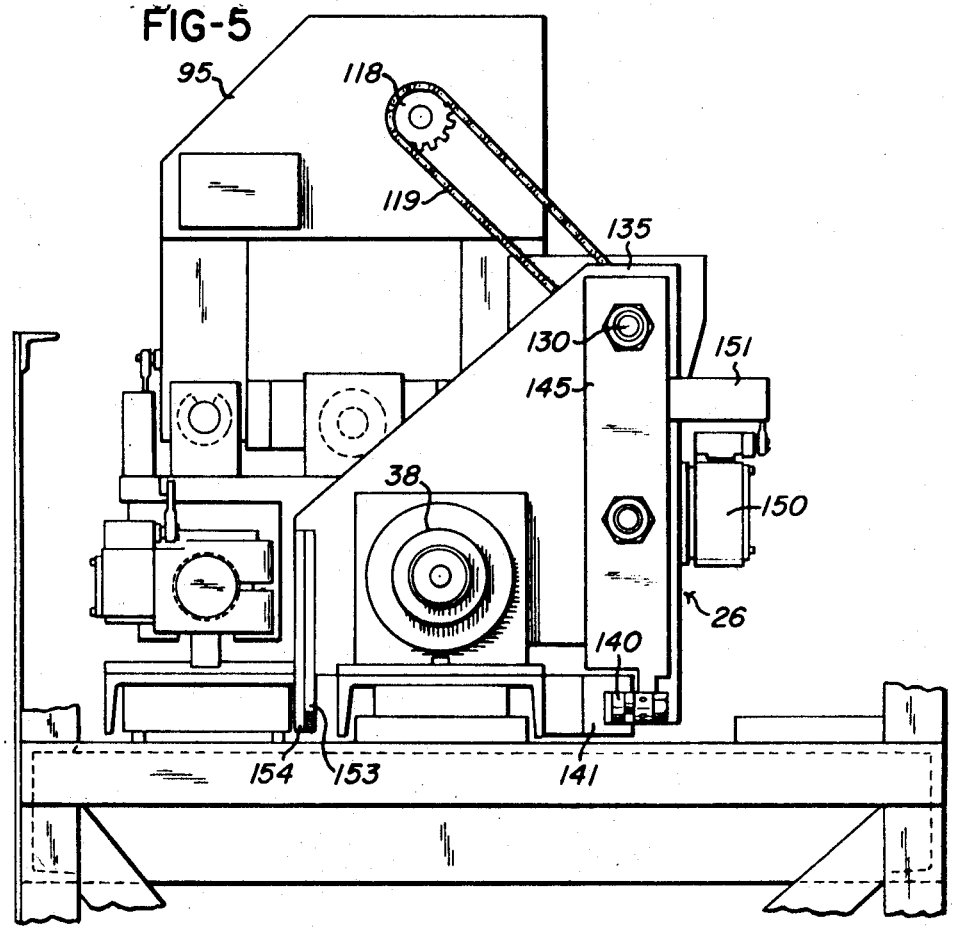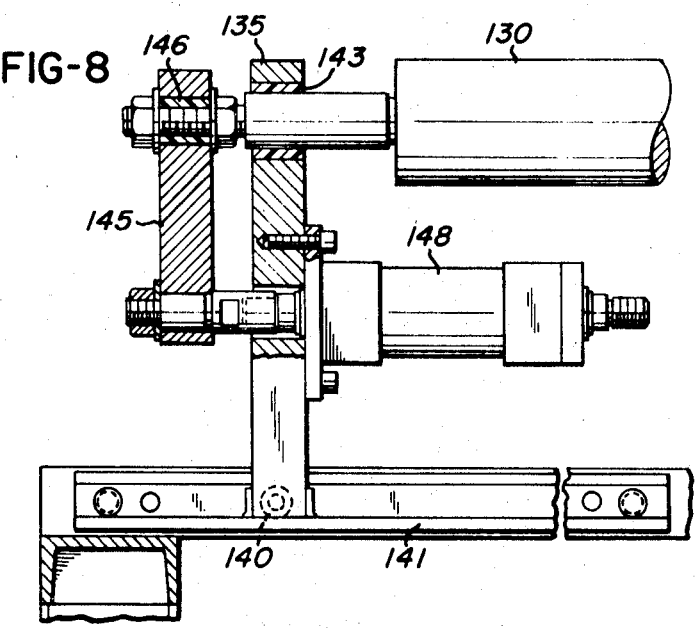

United States Patent Office 3,467,805
Patented Sept. 16, 1969

3,467,805
CAMSHAFT HARDENER
Ralph S. Easley and Donald J. Meyer, Cincinnati, Ohio, assignors to Park-Ohio Industries, Inc., a corporation of Ohio
Filed Sept. 8, 1966, Ser. No. 577,979
Int. Cl. H05b 5/08, 9/02
U.S. Cl. 219—10.57                        8 Claims

ABSTRACT OF THE DISCLOSURE

An induction heating apparatus, particularly useful in heat treating camshafts, includes a pair of carriage members for supporting a workpiece as it moves from a loading zone to a heating zone including at least one induction heating coil. A lead screw moves both carriage members in unison and provides accurate control over the rate of movement so that selected portions of the camshaft may be heat treated. The lead screw is formed in two sections which may be rotated relative to each other to vary the spacing between the carriages to accommodate workpieces of various sizes. A spindle supporting the workpiece may be rotated to assist in distributing heat, and spring means may be associated with one of the spindles, to allow for expansion of the workpiece during heating.

---

This invention relates to an improved camshaft hardening mechanism where the workpiece may be moved through a single induction heating coil or positioned in a multiple induction heating coil arrangement.

In hardening camshafts, such as used in automobile engines, it is usually desired to harden only certain specified portions of the shaft while leaving the remainder without any heat treatment. Automatic machinery to accomplish this has been developed which automtaically loads a previously machined camshaft between supporting centers, transfers this shart to a heating area where the predetermined selected portions of the shaft are heated, and then either transfers the shaft to a quenching bath where it is hardened or applies a spray of cooling fluid immediately after heating of the part is terminated. As each camshaft is unloaded from between the workpiece support centers, another camshaft is being brought into position preparatory to being transferred into the heating zone. It is also common in the type of heat treating apparatus which employs a plurality of induction heating coils to have cooling rings positioned in the various locations where hardening of the workpiece is not desired.

The apparatus of the present invention not only contemplates the heat treatment of camshafts, rocker arm shafts, and other similar shafts requiring certain selected areas of the shaft to be heated by using a multiplicity of induction heating coils, but is also versatile enough to locate accurately the areas to be hardened on the workpiece by using a single heating coil through which the workpiece may be progressively moved. This type of heat treating operation is difficult if not impossible to achieve in the prior art shaft hardening devices because of the mechanical limitations imposed by the type of carriage and drive mechanism used.

The present invention utilizes a workpiece support mechanism which includes a pair of carriages which may be driven in unison by a ball screw drive shaft, or which, if so desired, may be moved independently of each other. The ball screw drive permits positive control of the workpiece movement throughout the length of travel of the carriages. This arrangement lends versatility to the shaft hardening device by permitting accurate control of the movement of the shaft or workpiece through a single induction heating coil so that the heat may be applied accurately as the workpiece moves progressively through the induction heating coil and which allows the workpiece to be unloaded from between the workpiece supports at any position of the carriage with respect to the heating coils. This arrangement also allows one carriage to be moved away from the other carriage after the workpiece is installed thereby to place the workpiece in tension as hereinafter described, thus providing a rigid support.

Acordingly, it is an object of this invention to provide a versatile automatic loading shaft hardening apparatus which may be used to either heat treat selected areas of a shaft by employing a plurality of properly spaced induction heating coils or by passing the shaft progressively through a single induction heating coil.

It is another object of this invention to provide a shaft hardening machine of the type described, having workpiece supports which may be either moved separately, to accommodate workpieces of various sizes, or in unison, to transfer the workpiece from a loading area into a heating area.

It is another object of this invention to provide a shaft hardening apparatus of the type described including an automatic loading mechanism which may load and unload the workpiece between their supports at any position of the workpiece supports with respect to the frame of the apparatus to provide for quicker and more efficient operation.

It is another object of this invention to provide an automatic loading shaft hardening apparatus of the type described where a shaft may be progressively moved through an induction heating coil to cause heating of selected predetermined areas and quenched by a spray of cooling fluid applied to the shafts while they remain mounted between the workpiece supports.

It is another object of this invention to provide a shaft hardening apparatus of the type described wherein the shaft may be positively mounted between the workpiece supports and placed in tension during the subsequent heat treating operation.

Other objects and advantages of the invention will be apparent from the following description, the accompanying drawings and the appended claims.

In the drawings:

FIG. 1 is a front elevational view of the shaft hardening machine of this invention particularly showing the carriage and the workpiece supports in relation to the loading and heating zones;

FIG. 2b is a plan view of the right carriage mechanism and workpiece supports;

FIG. 3 is an end view of the left hand carriage support mechanism taken along the lines 3—3 in FIG. 2a;

FIG. 4 is a detailed view of the part alignment plate included in this invention;

FIG. 5 is an end view of the right hand carriage support mechanism taken along lines 5—5 in FIG. 2b;

FIG. 6 is a detailed side view of the left carriage drive mechanism;

FIG. 7 is an end view of the left carriage drive mechanism shown in FIG. 6; and

FIG. 8 is a sectional view taken along the lines 8—8 in FIG. 2b showing a portion of the right carriage mechanism.

Figure 2A:
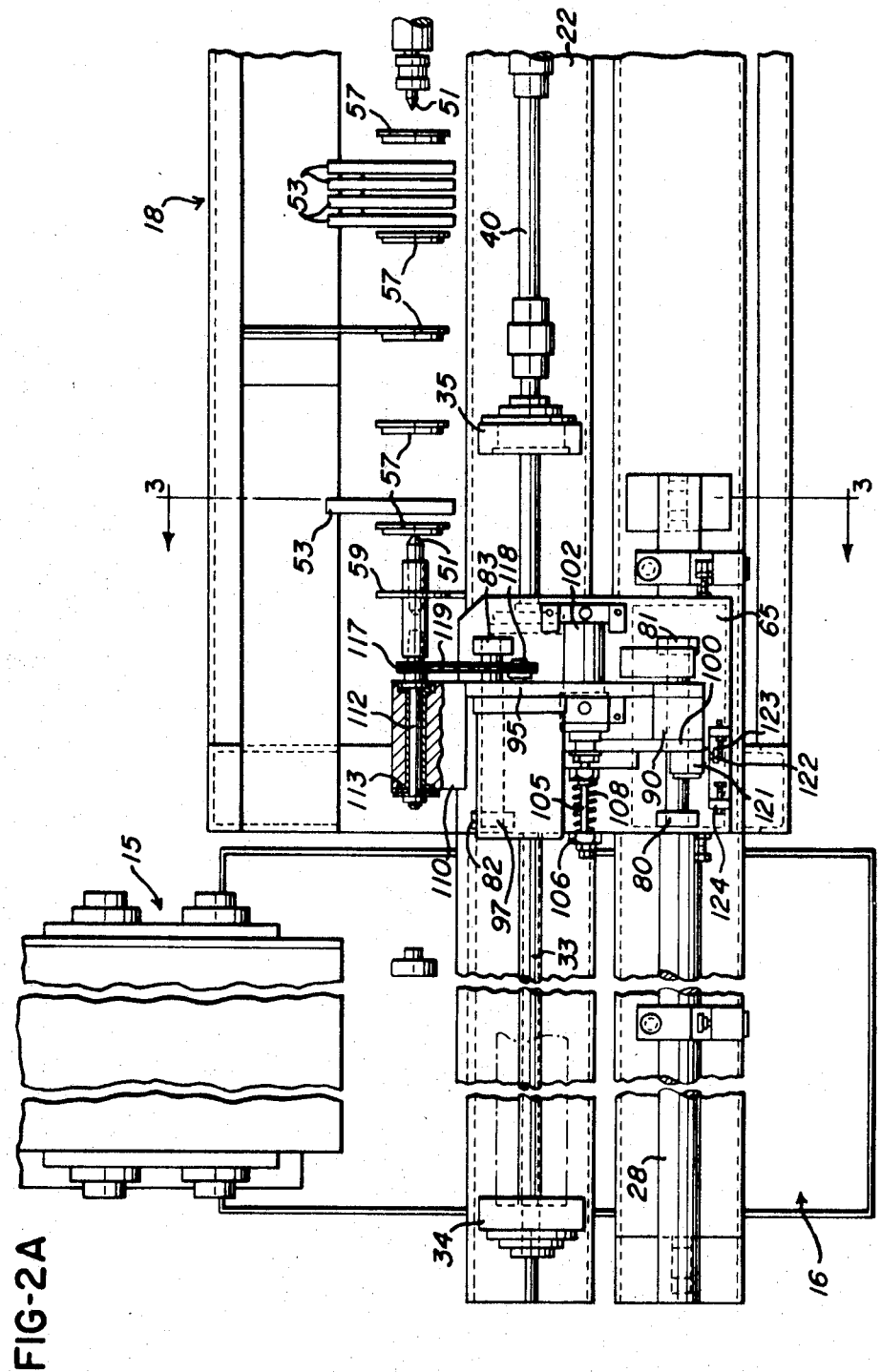
FIG. 2a is a plan view of the left portion of the heat treating machine of this invention showing one of the carriages and workpiece supports, and also showing the relative position of the loading zone and the induction heating coils with respect to the carriage mechanism.

Referring now to the drawings which show a preferred embodiment of this invention, the shaft hardening machine is shown generally at 10 and comprises a supporting frame member 11 supported by legs 12. These legs have adjustable members at their lower ends so that the supporting frame member may be leveled when the machine is installed in its operating location. An automatic loading and unloading device is shown generally at 15 in FIG. 2a at the left hand portion of the machine. A quenching tank 16 may also be positioned at the left hand portion of the apparatus for receiving the heated workpiece after their removal from the heating zone. The loading mechanism includes a loading arm 17 which removes the shafts or workpieces which are to be hardened one at a time from a rack and places them in a position where they may be loaded onto the workpiece support members and transferred into a heating zone shown generally at 18. An unloading arm 19 is also provided to receive the heated workpieces and discharge them into the quenching tank 16. In the preferred embodiment of this invention, the loading and unloading mechanisms are not integral parts of the heat treating machine, but are kept separate in order to provide flexibility in the number of applications in which the invention may be employed.

The support frame 11 has a plate 20 (FIG. 3) bolted thereto which extends from the right end of the frame 11 into the heating zone 18. Channel iron 21 is welded onto plate 20 and carries a guide plate 22. Also mounted on frame 11 immediately adjacent the plate 22 is a guide rail 28 which is shown in FIG. 3 mounted to a channel iron 29. The channel iron 29 is in turn adjustably mounted to frame 11 in such a manner that the guide rail 28 may be aligned with respect to the frame and to the bearing plate 22 to insure proper movement of the carriage 25. The channel iron 29 is attached to the frame 11 by bolts 30 which extend through a slot in the frame 11 and which are secured to a plate 31. Bolts 32 extend upwardly through the frame 11 to position adjustably the channel iron 29 and thus the guide rail 28.

The workpiece is moved from the loading zone 15 into the heating zone 17 by a lead screw comprising a ball screw which is divided into two sections, and which is mounted as the supporting frame 11. The left hand ball screw 33 is journaled at the left end by a bearing 34 and at its right end by a bearing 35 located within the heating zone. The right hand portion 36 of the ball screw is also supported by bearings 37 and 38. As can be seen from FIGS. 1 and 2, each of these bearings may be secured to the plate 22 by welding or by other suitable means. The left hand portion 33 and the right hand portion 36 of the ball screw may be joined by a coupling 40 secured to the left section 33 and right section 36 between bearings 35 and 37. Power to rotate the lead screw is obtained from a hydraulic motor 45 mounted on a bracket 46 and suspended beneath the frame 11. A pulley 47, attached to the motor, drives the chain 48 which is attached to the ball screw by pulley 49. In the preferred embodiment of this invention, the motor 45 is hydraulic although other types of drive means may be employed.

To accommodate workpieces of various sizes, the coupling 40 may be disengaged from either one of the ball screw sections and that section rotated to position the carriage the desired distance apart. In the preferred embodiment of this invention, the coupling may be reengaged at every one-sixth of a revolution of the ball screw.

The workpiece is supported between two spindles or workpiece support centers 51 and 52 and caused to travel from a loading position 15 into the heating zone 18 by moving both spindles in unison. As shown in FIG. 1, the heating zone 18 may include a plurality of induction heating coils 53 mounted to electrical bus bars and supplied with cooling fluid, such as water, and high frequency electrical current from a suitable source, the details of which are well known to those skilled in the art and form no part of the present invention. Cooling rings 57 may also be included within the heating zone to act as a heat sink and keeping certain predetermined areas of the workpiece from being heated and thus hardened. The workpiece support spindles are both accurately aligned with the induction heating coils so that as the workpiece is moved in position, the outermost portions thereof will clear the heating coil.

To insure that the workpiece is accurately aligned and firmly supported by the workpiece spindles 51 and 52, a part alignment plate 59 may be mounted to but insulated from the frame 11. This alignment plate, as shown in detail in FIG. 4, comprises an electrically conductive plate 59 having a central opening only slightly larger than the largest dimension of the workpiece in axial alignment with the spindles 51 and 52 and with the openings in the induction heating coils and cooling rings. An electrical conductor 51 connects the plate to a safety circuit which may cause power to be removed from the machine whenever a workpiece engages plate 59 and completes a circuit through the plate to ground.

The coupling 40 between the two sections of the ball screw may be provided with a differential screw (not shown) which could then alter the spacing between the workpiece support centers 51 and 52. If gripping clutches were used rather than center supports 51 and 52 as shown in FIGS. 1 and 2, the workpiece could then be gripped securely at each end and placed in tension by rotating the differential screw. This modification could be especially useful when hardening materials of small diameter where there may be a possibility of warping of the workpiece during the heating cycle.

The spindle 51 is supported and moved relative to the frame 11 by the carriage 25. This carriage consists of a base member 65 which is supported on one side on the guide rail 28 by pushing 66 in bracket 67. As shown in FIGS. 6 and 7, the carriage 25 is drivingly secured to the ball screw 33 by a ball screw nut 70 which is mounted to a bracket 71 suspended beneath the base plate 65. The ball screw nut 70 is secured to the bracket 71 by three screws 72. By removing these screws, and rotating the nut 70, the relative placement of the carriage with respect to the frame may be altered without rotating the ball screw 33. In the preferred embodiment of this invention, the ball screw 33 causes the carriage to travel through one inch for each revolution. Therefore, by removing the screw 72 and rotating the nut 70, the carriage may be made to rotate through one-third inch increments, if desired, thereby providing a second method for adjusting the spacing between the carriages.

The other side of the carriage 25 is supported by the roller bearing 76, which is mounted on plate 77 extending between the bracket 71 at the forward part of the carriage and bracket 78 at the rearward part of the carriage, and which rides in the C-shaped bearing portion of the bracket 75.

Relative movement is provided between the carriage 25 and the workpiece support center or spindle 51 to allow both for the loading of the workpiece and also for expansion as the workpiece is heated. To accomplish this, four upwardly extending brackets 80, 81, 82 and 83 are secured to the upper surface of base plate 65. Extending between and mounted to brackets 80 and 81 is a guide rod 85. In like manner, a guide rod 86 extends between and is fixedly secured to the upwardly extending brackets 82 and 83. A frame 88 is slidably mounted on the guide rods 85 and 86. The frame 88 consists of a pair of upstanding side plates 90 and 91 which contain bearings 92 and 93. Extending across the top portion of the brackets 90 and 91 is a plate 95. This plate supports a hydraulic motor 97, the purpose of which will be explained later. Extending between the plates 90 and 91 at approximately the same level as the guide rods 85 and 86 is a transverse plate 100 having a circular opening 101 in its central portion.

The frame 88 may be moved relative to the base plate 65 by means of a hydraulic cylinder 102. As shown in FIG. 2a, the right end of hydraulic cylinder 102 is secured to an upstanding bracket 103 which is in turn mounted to the base plate 65. A shaft 105 extends from the cylinder 102 through the opening 101 in the plate 100. A nut 106 is threaded onto the end of the shaft and provides a bearing surface for the spring 108. The other end of the spring is secured to the plate 100. The plate is therefore urged to the right by spring 108 but is limited in its movement to the right by the engagement of the plate 100 with the flange portion 109 on the hydraulic cylinder 112. The hydraulic cylinder is therefore capable of moving the plate 100 either to the right or to the left, depending upon the particular mode of operation desired, while the plate 100 may be moved to the left against the spring in the event that the workpiece either changes dimension during heating or is improperly centered when the hydraulic cylinder moves the plate to the right limit position. In addition, the spring 108 provides a biasing means to hold firmly the workpiece between the spindles 51 and 52.

Even distribution of heat may be obtained around the circumference of the workpiece by rotating it about its own axis. For this purpose, a hydraulic motor 97 is connected to the spindle 51 by means of the shaft 112 which is supported in the bracket 110 by bearings 113. A gear 117 is positioned in the right hand end of shaft 112 in alignment with the gear 118 which is mounted at the end of the hydraulic motor 97. A chain drive 119 conects these two gears to cause rotation of the shaft 112. The workpiece support spindle 51 is seen in FIG. 2a coupled to the shaft 112. Thus, rotation of the motor 97 will cause the spindle 51 to rotate about its center axis and thereby, through friction, cause rotation of the workpiece.

The position of the frame 88 may be determined by the microswitch 121 secured to the vertical member 90. Extending from the microswitch is an actuating arm 122 movable between the adjustable stops 123 and 124 mounted on the bracket 125. With the carriage in the normal position, as shown in FIG. 2a, stop 123 engages the actuating arm 122 and closes one set of contacts of the microswitch 121. This transmits a signal to the appropriate control circuitry and indicating lights positioned on the control panel of the machine. Moving the frame 88 to the left, or to the workpiece loading position, will cause the actuating arm 122 to move as it engages the stop 124 and thus cause an indication that the spindle 51 is in its fully retracted position.

The right hand spindle 52 is rotatably mounted at the end of an elongated shaft 130 which extends through the heating zone 18 and the induction coils 53 into the loading zone when the machine is in the loading position. The shaft 130 is supported immediately to the right of the heating zone by a bracket 131 which is securely fixed to the plate 22. Mounted to the upper portion of the bracket 131 is a bushing 133 which slidably supports the shaft 130.

The right end of the elongated shaft 130 is supported by the movable carriage 26 having as its main member a vertical bracket 135. A ball nut 136 is securely attached to the bracket 135 and is in driving engagement with the ball screw 36. The lower portion of bracket 135 is slidably attached to the frame 11 by a roller 140 (FIG. 8) movable in a C-shaped slide way 141 extending from the right hand portion of the machine to approximately the heating zone 18. A reduced portion of shaft 130 extends through bracket 135 and is supported therein by an insulating collar 143. The end portion of shaft 130 may be fixedly mounted to an upstanding member 145 by suitable lock nuts as shown in FIG. 8.

It has been found that in induction heating devices of this type, it is desirable to prevent a complete electrical circuit from the frame through the workpiece and back to the frame since currents may be generated in the workpiece when the induction heating coils are energized which could cause arcing and damage the sliding surfaces. To break this electrical circuit shaft 130 is insulated from member 145 by an insulating collar 146 and from bracket 135 by insulating collar 143. The other end of the workpiece, however, may be connected directly to the frame to provide a ground path for the part alignment detector circuit.

In the preferred embodiment of this invention, the right hand spindle member 52 is also movable relative to its carriage 26 so that both spindles may be moved apart in order to load and unload the workpiece. A hydraulic cylinder 148 has its body portion secured to the bracket 135 and the movable piston secured to the movable member 145 as shown in FIG. 8. Application of hydraulic pressure to one side of the piston in the cylinder 148 will cause the member 145, along with the elongated shaft 130 and spindle 52, to move toward the right or toward the unloading position. Pressure on the other side of the piston will return the spindle to its loading position. A bracket 149 is carried on the upstanding movable member 145 and has two outwardly extending lugs 150 and 151 which are positioned to engage the actuating lever on a limit switch 152. The position of the spindle 52 with respect to the carriage 26 may therefore be monitored by the switch 152.

A pair of cams 153 and 154 are also mounted on the bracket 135 and carried therewith. These cams actuate deceleration valves 156 and 157 which are mounted on the frame 11. As the carriage 26 moves from the heating position, as shown in FIG. 1, to the loading position, cam 153 will engage the actuator on hydraulic valve 156 to limit the flow of hydraulic fluid to the driving motor 45 and thus slow down the movement of the workpiece and the carriages immediately prior to stopping in the loading position. In a like manner, cam 153 cooperates with the deceleration valve 157 which allows smooth stopping of the carriage and workpiece as it approaches and is positioned within the heating zone 18.

The sequence of operation of the heat treating apparatus will next be described. After the loading hopper has been supplied with the machined shafts which are to be hardened, the loading arm 17 engages one of the shafts and moves it into alignment with the workpiece support centers or spindles. Hydraulic pressure is then applied to both cylinders 102 and 148 to move the workpiece centers into positive engagement with the workpiece.

It will be noted that the spacing of the centers would have been previously adjusted to accommodate the length of the shafts which are now hardened, by either disengaging the coupling 40 from the ball screw 33 and rotating one section of the lead screw relative to the other to move the carriages or by removing the screws 72 and rotating nut 70 relative to the carriage 25. The left hand center 51 is spring loaded by spring 105 to securely hold the workpiece in place. Hydraulic motor 97 may then be actuated to cause the workpiece to rotate about its center axis. At the same time, driving motor 45 rotates the ball screws 33 and 36 to move both carriages 25 and 26 in unison to the right and place the workpiece in the heating zone.

The center alignment of the workpiece is monitored by the part alignment safety plate 59 as the workpiece moves into the heating zone. Should the workpiece be misaligned and engage the plate 59, it will cause a ground potential to be applied through conductor 61 to the safety circuit and terminate the operation of the machine.

In the embodiment of the invention shown in FIG. 1, the workpiece may be placed completely in the heating zone before heat is applied to a multiple coil induction heating circuit. It is to be understood, however, that accurate control over the movement of the workpiece support carriages, such as provided by using the ball type lead screws 33 and 36, allows a single induction heating coil to be used which may be energized in accordance with the position of the workpiece as it progresses through that coil. Of course, either a set of switches actuated by the carriage mechanism or a part detecting arrangement could be included to control the power applied to the induction heating coil.

As the part advances into the heating zone, the loading arm 17 moves up to engage another workpiece. The unloading arm 19 also moves up at this time preparatory to receiving the workpiece after the heating operation is concluded. After the heat has been applied to the workpiece for the appropriate amount of time and to the selected areas, the hydraulic motor 45 is again energized, this time in the opposite direction, to move the carriages 25 and 26 in unison toward the left or loading position. At the completion of the traversing movement to the left, hydraulic pressure is applied to cylinders 102 and 148 to cause both centers to move out, thus releasing the workpiece onto the unloading arm 19. This arm then moves the workpiece either into a quenching tank 16 or into an unloading hopper.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. An induction type heat treating apparatus comprising:
   a supporting frame member;
   a loading zone and a heating zone defined on said frame member;
   said heating zone including at least one induction heating coil;
   a first carriage member movably mounted on said frame member;
   a first spindle movably mounted on and carried by said first carriage member and positioned in alignment with said induction heating coil;
   a second carriage member movably mounted on said frame member;
   a second spindle movably mounted on and carried by said second carriage member and positioned in alignment with said induction heating coil; and
   means for moving both said carriage members in unison relative to said frame between said loading zone and said heating zone, said means including a lead screw mounted for rotation on said frame and motor means for rotating said lead screw, said lead screw being in engagement with both of said carriages to move said carriages in unison relative to said frame member between the loading zone and the heating zone;
   one of said spindles being so elongated that a workpiece may be loaded and unloaded from between said spindles in said loading zone remotely located from said heating zone and then subsequently transferred into said heating zone where selected portions of the workpiece may be heat treated.

2. The apparatus as defined in claim 1 further including means on at least one of said carriage members for moving the spindle mounted thereon relative to said carriage member and away from the other said spindle to permit mounting of the workpiece therebetween.

3. The apparatus as defined in claim 1 wherein said spindles are mounted for rotation about their own axes and further including means to rotate one of said spindles about its own axis to cause rotation of the workpiece while in the heating zone.

4. The apparatus as defined in claim 1 wherein one of said carriage members includes spring biasing means to urge the spindle mounted thereon toward the other spindle and into engagement with the workpiece.

5. The apparatus as defined in claim 1 further including automatic loading means in said loading zone for supplying a workpiece between said first and second spindles.

6. The apparatus as defined in claim 1 wherein said lead screw is a ball screw which is divided into two sections, each of said sections operably associated with one of said carriage members, and wherein means are included to allow rotation of one section relative to the other to vary the spacing between said carriages to accommodate workpieces of various sizes.

7. The apparatus as defined in claim 1 wherein the end portion of said elongated spindle is supported near the heating zone by a bearing fixedly mounted to said frame.

8. An induction type heat treating apparatus comprising:
   a supporting frame member;
   a loading zone and a heating zone defined on said frame member;
   said heating zone including at least one induction heating coil;
   a first carriage member movably mounted on said frame member;
   a first spindle movably mounted on and carried by said first carriage member and positioned in alignment with said induction heating coil;
   a second carriage member movably mounted on said frame member;
   a second spindle movably mounted on and carried by said second carriage member and positioned in alignment with said induction heating coil;
   means for moving both said carriage members in unison relative to said frame between said loading zone and said heating zone;
   one of said spindles being so elongated that a workpiece may be loaded and unloaded from between said spindles in said loading zone remotely located from said heating zone and then subsequently transferred into said heating zone where selected portions of the workpiece may be heat treated; and
   a hydraulic cylinder having one end mounted to said first carriage member, and spring means interconnecting the other end of said hydraulic cylinder with said first spindle to permit movement of said spindle away from said second spindle to allow for expansion of the workpiece during the heating operation and to bias the spindle against the workpiece to hold it securely, said other end of said hydraulic cylinder having a portion thereof positioned to move said first spindle in a direction away from said second spindle independently of said spring and thereby to place the apparatus in a condition for loading or unloading.

References Cited

UNITED STATES PATENTS 2,574,564  11/1951  Högel et al. ____ 219—10.57 X
2,794,894  6/1957  Tudbury _____ 219—10.57

JOSEPH V. TRUHE, Primary Examiner

L. H. BENDER, Assistant Examiner